USO11122160B1

(12) United States Patent
Fardig et al.

(10) Patent No.: US 11,122,160 B1
(45) Date of Patent: Sep. 14, 2021

(54) DETECTING AND CORRECTING AUDIO ECHO

(71) Applicant: LENOVO (Singapore) PTE. LTD., New Tech Park (SG)

(72) Inventors: Matthew Fardig, Boonville, IN (US); Tobias Christensen, San Francisco, CA (US); Shawn Sharp, Buhl, ID (US); Joshua Smith, Milton, FL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/924,007

(22) Filed: Jul. 8, 2020

(51) Int. Cl.
  *H04M 3/00* (2006.01)
  *G10L 15/183* (2013.01)
  *G10L 21/02* (2013.01)

(52) U.S. Cl.
  CPC ........... *H04M 3/002* (2013.01); *G10L 15/183* (2013.01); *G10L 21/0202* (2013.01)

(58) Field of Classification Search
  CPC ........ H04M 3/568; H04M 3/56; H04M 9/082; H04M 3/2236; H04M 2207/18; H04M 2250/02; H04M 1/035; H04M 1/6008; H04M 1/605; H04M 1/72519; H04M 2250/06; H04M 2250/62; H04M 3/2227; H04M 2203/2038; H04M 3/002; H04M 3/42042; H04M 3/533; H04M 3/561; H04M 3/562; H04M 3/563; H04M 3/564; H04M 7/006; H04M 3/567; H04M 11/06; H04M 11/066; H04M 2203/5036; H04M 7/0057; H04M 3/42; H04M 1/6033; H04M 7/1245; H04M 7/1255; H04M 3/569; H04M 7/0069; H04M 1/6041; H04M 9/08; H04M 2201/40; H04M 2203/5027; H04M 2203/509; H04M 3/34; H04M 1/724; H04M 3/22; H04M 3/565; H04M 9/085; H04M 9/087; H04R 3/005; H04R 2410/05; H04R 3/00; H04R 2430/23; H04R 1/08; H04R 2430/01; H04R 29/001; H04R 29/004; H04R 3/002; H04R 27/00; H04R 3/02; G01L 15/183; G01L 21/0202

See application file for complete search history.

(56) References Cited

U.S. PATENT DOCUMENTS

| 10,652,679 B1 * | 5/2020 | Boss .................... H04L 65/602 |
| 2007/0189507 A1 * | 8/2007 | Tittle .................... H04M 9/082 |
| | | 379/406.01 |

(Continued)

*Primary Examiner* — Akelaw Teshale
(74) *Attorney, Agent, or Firm* — Kunzler Bean & Adamson

(57) ABSTRACT

Apparatuses, methods, systems, and program products are disclosed for detecting and correcting audio echo. An apparatus includes a processor and a memory that stores code executable by the processor. The code is executable by the processor to detect audio that is received through an audio channel of a first user during a conference call being echoed through an audio channel of a second user in the conference call. The code is executable by the processor to identify the second user associated with the audio channel that is echoing the audio of the first user. The code is executable by the processor to perform a corrective action associated with the second user to prevent audio that is received from the first user from being echoed through the audio channel of the second user.

18 Claims, 6 Drawing Sheets

(56) References Cited

U.S. PATENT DOCUMENTS

| | | | |
|---|---|---|---|
| 2010/0135481 A1* | 6/2010 | Frauenthal | H04B 3/23 379/406.06 |
| 2014/0112467 A1* | 4/2014 | Wyss | H04B 3/23 379/406.08 |
| 2015/0124986 A1* | 5/2015 | Li | G10L 21/02 381/66 |
| 2016/0050491 A1* | 2/2016 | Ahgren | H04B 3/23 381/66 |
| 2019/0349471 A1* | 11/2019 | Ferguson | H04M 3/568 |

* cited by examiner

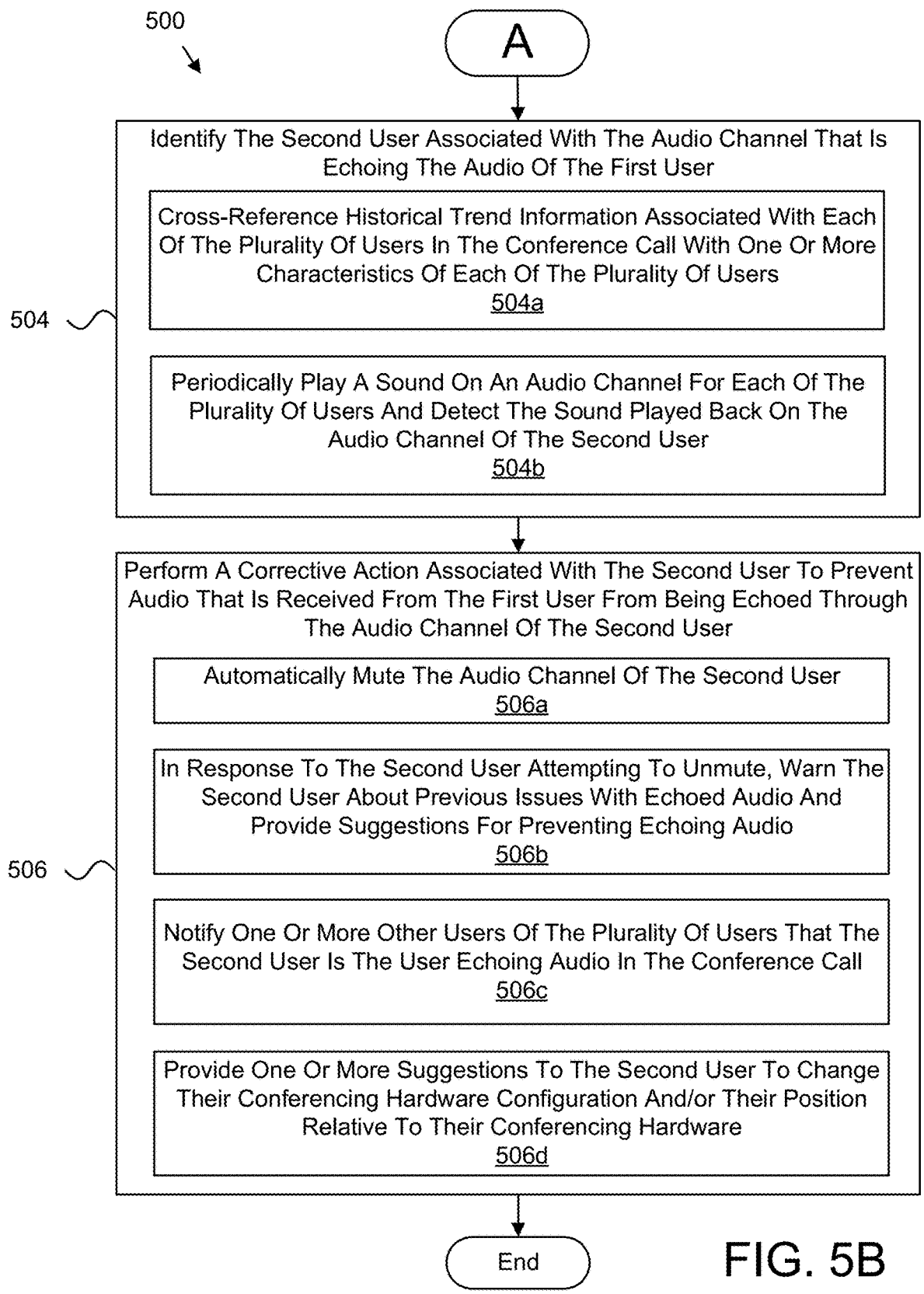

DETECTING AND CORRECTING AUDIO ECHO

FIELD

The subject matter disclosed herein relates to detecting and correcting audio echo and more particularly relates to detecting audio echo during a conference call and performing actions to correct for the audio echo.

BACKGROUND

During conference calls, online or otherwise, there may be an attendee that is using speakers for audio output rather than headphones. In situations like this, if the attendee's microphone is too close to the speakers, then the audio from the speaker may be fed back into the conference as new audio from the attendee with the microphone. This causes an echo effect and can be distracting for other conference attendees.

BRIEF SUMMARY

Apparatuses, methods, systems, and program products are disclosed for detecting and correcting audio echo. An apparatus, in one embodiment, includes a processor and a memory that stores code executable by the processor. In certain embodiments, the code is executable by the processor to detect audio that is received through an audio channel of a first user during a conference call being echoed through an audio channel of a second user in the conference call. In one embodiment, the code is executable by the processor to identify the second user associated with the audio channel that is echoing the audio of the first user. In some embodiments, the code is executable by the processor to perform a corrective action associated with the second user to prevent audio that is received from the first user from being echoed through the audio channel of the second user.

A method for detecting and correcting audio echo, in one embodiment, includes detecting, by a processor, audio that is received through an audio channel of a first user during a conference call being echoed through an audio channel of a second user in the conference call. The method, in further embodiments, includes identifying the second user associated with the audio channel that is echoing the audio of the first user. In certain embodiments, the method includes performing a corrective action associated with the second user to prevent audio that is received from the first user from being echoed through the audio channel of the second user.

A computer program product for detecting and correcting audio echo, in one embodiment, includes a computer readable storage medium having program instructions embodied therewith. In certain embodiments, the program instructions are executable by a processor to cause the processor to detect audio that is received through an audio channel of a first user during a conference call being echoed through an audio channel of a second user in the conference call. In some embodiments, the program instructions are executable by a processor to cause the processor to identify the second user associated with the audio channel that is echoing the audio of the first user. In further embodiments, the program instructions are executable by a processor to cause the processor to perform a corrective action associated with the second user to prevent audio that is received from the first user from being echoed through the audio channel of the second user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5B is a continuation of the schematic flow chart diagram depicted in FIG. 5A for detecting and correcting audio echo.

DETAILED DESCRIPTION

Figure 1:
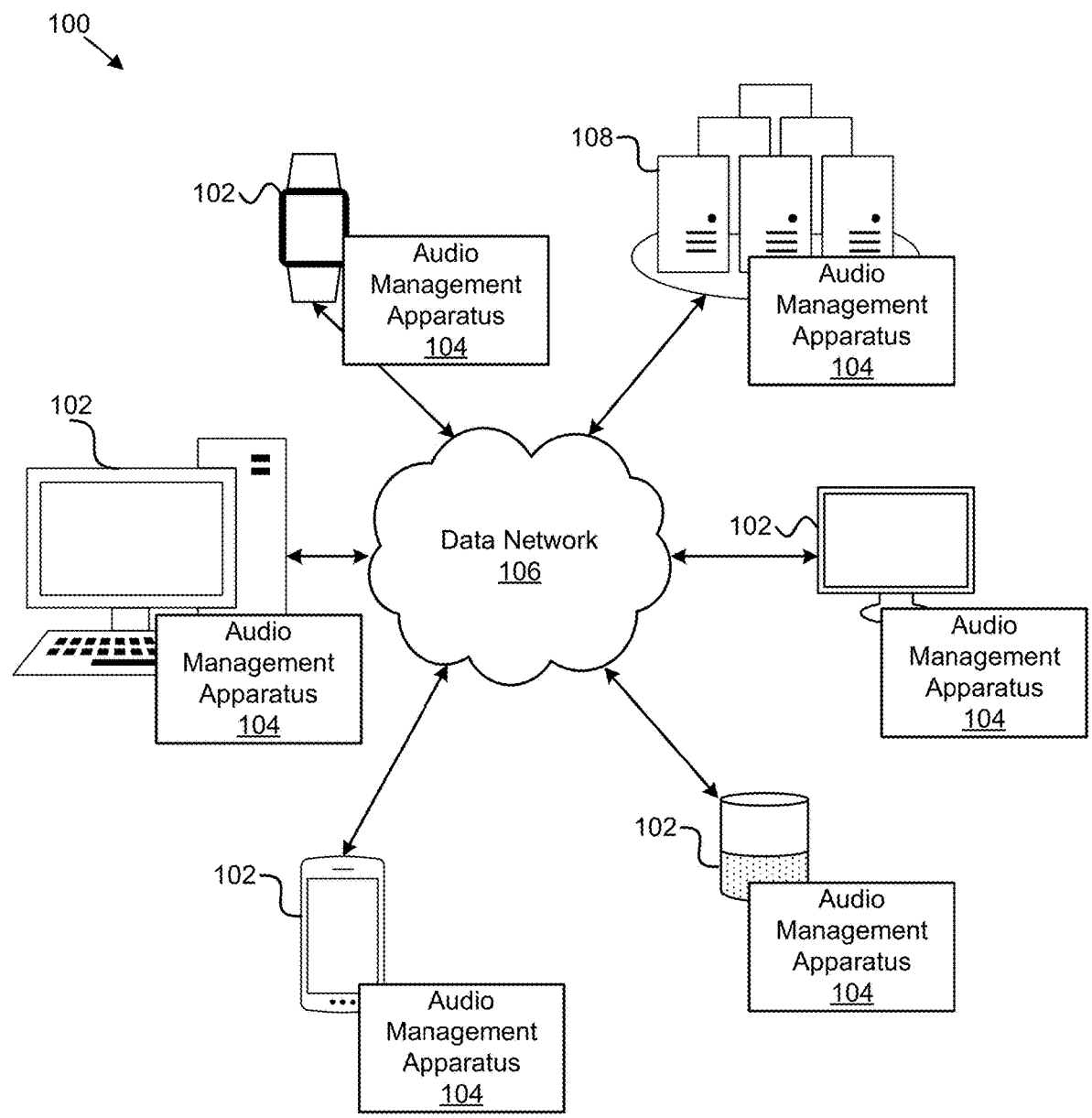
FIG. 1 is a schematic block diagram illustrating one embodiment of a system for detecting and correcting audio echo.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to detect audio that is received through an audio channel of a first user during a conference call being echoed through an audio channel of a second user in the conference call. In one embodiment, the code is executable by the processor to identify the second user associated with the audio channel that is echoing the audio of the first user. In some embodiments, the code is executable by the processor to perform a corrective action associated with the second user to prevent audio that is received from the first user from being echoed through the audio channel of the second user.

In one embodiment, detecting the echoed audio comprises detecting phrases received on the audio channel of the first user being repeated through the audio channel of the second user within a predefined period of time after receiving the audio on the audio channel of the first user. In further embodiments, the code is executable by the processor to determine that audio received on the audio channel of the first user is being echoed through the audio channel of the second user in response to a number of detected repeated phrases satisfying a threshold number.

In some embodiments, the code is executable by the processor to compare a transcription of audio received on the audio channel of the first user to a transcription of audio received on the audio channel of the second user to detect that the phrases spoken by the first user are being repeated through the audio channel of the second user. In various embodiments, detecting the echoed audio comprises comparing one or more characteristics of audio received on the audio channel of the first user to one or more characteristics of audio received on the audio channel of the second user in response to receiving audio on the audio channel of the second user within a predefined period of time after receiving audio on the audio channel of the first user.

In one embodiment, the compared one or more characteristics of the audio received on the audio channels of the first user and the second user comprises one or more of an audio length and an audio signature. In some embodiments, identifying the second user associated with the audio channel that is echoing the audio of the first user comprises cross-referencing historical trend information associated with each of the plurality of users in the conference call with one or more characteristics of each of the plurality of users.

In certain embodiments, the one or more characteristics comprises one or more of a conferencing hardware configuration of each user and a position of each user relative to their conferencing hardware. In some embodiments, identifying the second user associated with the audio channel that is echoing the audio of the first user comprises periodically playing a sound on an audio channel for each of the plurality of users and detecting the sound played back on the audio channel of the second user.

In one embodiment, the sound is played on the audio channel for each of the plurality of users at a frequency that is outside a range of human hearing. In some embodiments, performing the corrective action comprises automatically muting the audio channel of the second user. In one embodiment, performing the corrective action comprises, in response to the second user attempting to unmute, warning the second user about previous issues with echoed audio and providing suggestions for preventing echoing audio.

In certain embodiments, performing the corrective action comprises notifying one or more other users of the plurality of users that the second user is the user echoing audio in the conference call. In one embodiment, performing the corrective action comprises providing one or more suggestions to the second user to change their conferencing hardware configuration and/or their position relative to their conferencing hardware.

A method for detecting and correcting audio echo, in one embodiment, includes detecting, by a processor, audio that is received through an audio channel of a first user during a conference call being echoed through an audio channel of a second user in the conference call. The method, in further embodiments, includes identifying the second user associated with the audio channel that is echoing the audio of the first user. In certain embodiments, the method includes performing a corrective action associated with the second user to prevent audio that is received from the first user from being echoed through the audio channel of the second user.

In one embodiment, detecting the echoed audio comprises detecting phrases received on the audio channel of the first user being repeated through the audio channel of the second user within a predefined period of time after receiving the audio on the audio channel of the first user.

In one embodiment, detecting the echoed audio comprises comparing a transcription of audio received on the audio channel of the first user to a transcription of audio received on the audio channel of the second user to detect that the phrases spoken by the first user are being repeated through the audio channel of the second user.

In one embodiment, detecting the echoed audio comprises comparing one or more characteristics of audio received on the audio channel of the first user to one or more characteristics of audio received on the audio channel of the second user in response to receiving audio on the audio channel of the second user within a predefined period of time after receiving audio on the audio channel of the first user.

In one embodiment, identifying the second user associated with the audio channel that is echoing the audio of the first user comprises cross-referencing historical trend information associated with each of the plurality of users in the conference call with one or more characteristics of each of the plurality of users.

A computer program product for detecting and correcting audio echo, in one embodiment, includes a computer readable storage medium having program instructions embodied therewith. In certain embodiments, the program instructions are executable by a processor to cause the processor to detect audio that is received through an audio channel of a first user during a conference call being echoed through an audio channel of a second user in the conference call. In some embodiments, the program instructions are executable by a processor to cause the processor to identify the second user associated with the audio channel that is echoing the audio of the first user. In further embodiments, the program instructions are executable by a processor to cause the processor to perform a corrective action associated with the second user to prevent audio that is received from the first user from being echoed through the audio channel of the second user.

FIG. 1 is a schematic block diagram illustrating one embodiment of a system 100 for detecting and correcting audio echo. In one embodiment, the system 100 includes one or more information handling devices 102, one or more audio management apparatuses 104, one or more data networks 106, and one or more servers 108. In certain embodiments, even though a specific number of information handling devices 102, audio management apparatuses 104, data networks 106, and servers 108 are depicted in FIG. 1, one of skill in the art will recognize, in light of this disclosure, that any number of information handling devices 102, audio management apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the audio management apparatus 104 is configured to detect audio that is received through an audio channel of a first user during a conference call being echoed through an audio channel of a second user in the conference call, identify the second user associated with the audio channel that is echoing the audio of the first user, and perform a corrective action associated with the second user to prevent audio that is received from the first user from being echoed through the audio channel of the second user. The audio management apparatus 104, including its various sub-modules, may be located on one or more information handling devices 102 in the system 100, one or more servers 108, one or more network devices, and/or the like. The audio management apparatus 104 is described in more detail below with reference to FIG. 2.

In various embodiments, the audio management apparatus 104 may be embodied as part of an information handling device 102 such as a smart device, a network device, an Internet of Things device, a computing device, a conference call device (e.g., a speaker, microphone, headset, or the like), or as a hardware appliance that can be installed or deployed on an information handling device 102, on a server 108, on a user's mobile device, on a display, or elsewhere on the data network 106.

In certain embodiments, the audio management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the audio management apparatus 104 may include a power interface, a wired and/or wireless network interface, a graphical interface that attaches to a display, and/or a semiconductor integrated circuit device as described below, configured to perform the functions described herein with regard to the audio management apparatus 104.

The audio management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the audio management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the audio management apparatus 104.

The semiconductor integrated circuit device or other hardware appliance of the audio management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the audio management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may host, store, stream, or the like applications, files, and content associated with audio and/or video conference calls.

Figure 2:
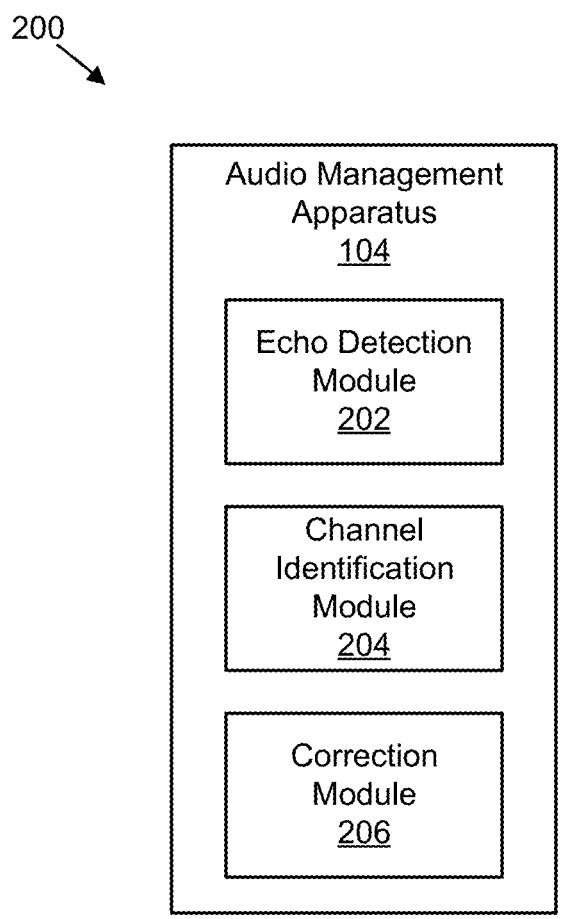
FIG. 2 is a schematic block diagram illustrating one embodiment of an apparatus for detecting and correcting audio echo.

FIG. 2 is a schematic block diagram illustrating one embodiment of an apparatus 200 for detecting and correcting audio echo. In one embodiment, the apparatus 200 includes an instance of an audio management apparatus 104. In one embodiment, the audio management apparatus 104 includes one or more of an echo detection module 202, a channel identification module 204, and a correction module 206, which are described in more detail below.

The echo detection module 202, in one embodiment, is configured to detect audio that is received through an audio channel of a first user during a conference call being echoed through an audio channel of a second user in the conference call. As used herein, a conference call may be a phone call, video call, internet call, and/or some combination of the foregoing that includes a plurality of users whose devices are connected over a data network for simultaneous, real-time communication.

In one embodiment, the echo detection module 202 detects the echoed audio by detecting phrases received on the audio channel of the first user being repeated through the audio channel of the second user. For example, attendee 1 says phrase one. Attendee 2's audio channel then sends audio with phrase one. Attendee 3 says phrase two, and then Attendee 2's audio channel says phrase two. Attendee 2 may then be identified, as described below, as causing the issue with audio being repeated back into the conference based on the repeating phrases.

In one embodiment, the echo detection module 202 may maintain, create, update, track, store, save, generate, or the like a transcription of audio received on each audio channel for each user in the conference, in real-time or live during the conference, and may compare the transcriptions to determine whether a phrase, sentence, or other series of words that is received on an audio channel of a first user matches a phrase, sentence, or other series of words that is received on an audio channel of a second user.

In one embodiment, the echo detection module 202 determines that audio received on the audio channel of the first user is being echoed through the audio channel of the second user in response to a number of detected repeated phrases satisfying a threshold number. For instance, the echo detection module 202 may determine whether the number of phrases, sentences, or series of words that match between the audio received on the audio channel of the first user and the audio received on the audio channel of the second user meets or exceeds a threshold such as three words, five words, ten words, one sentence, two phrases, or the like.

In further embodiments, the echo detection module 202 detects the echoed audio by comparing one or more characteristics of audio received on the audio channel of the first user to one or more characteristics of audio received on the audio channel of the second user in response to receiving audio on the audio channel of the second user within a predefined period of time after receiving audio on the audio channel of the first user.

For instance, the echo detection module 202 may track a length of the audio (e.g., the length of time of the audio), an audio or sound signature for the audio, a tone of the audio, a volume of the audio, and/or the like for the audio that is received on the audio channel of the first user and compare it to the corresponding characteristics of audio that is received on an audio channel for a second user. For example, attendee 1 has three seconds of audio on their audio channel. Attendee 2 has three seconds of audio starting just a few milliseconds after attendee 1. Attendee 3 sends ten seconds of audio, and attendee 2 sends ten seconds of audio starting just a few milliseconds after Attendee 3. In this situation, attendee 2 may be identified as echoing back the audio into the conference call.

For example, the echo detection module 202 may determine or track an audio or sound signature for the audio received on the audio channel of the first user and the audio or sound signature for audio received on the audio channel of the second user and compare the sound signatures to determine whether the sound signatures match (within a predefined threshold, sensitivity, or the like). If so, the echo detection module 202 may determine that there is an echo; otherwise, the echo detection module 202 may determine that no echo is present.

In the foregoing embodiments, the echo detection module 202 determines whether the phrases, sentences, or other series of words or audio characteristics between the audio that is received on the audio channel of the first user and the audio that is received on the audio channel of the second user match within a period of time after the first user speaks the phrases, sentences, or other series of words. For instance, the echo detection module 202 may determine whether the phrases, sentences, or other series of words that are received on the audio channel of the second user are received right after (e.g., milliseconds after) the phrases, sentences, or other series of words are received on the audio channel of the first user, within seconds of being received on the audio channel of the first user, or the like.

If so, the echo detection module 202 may determine that the second user's conference setup is causing an echo. Otherwise, if there is a longer pause (e.g., ten seconds, thirty seconds, one minute, or the like) between receiving the audio on the audio channel of the first user and receiving a matching audio on the on the audio channel of the second user, the echo detection module 202 may determine that there is not an echo, or may determine that there is an echo, but that there may be other issues with the conference call, e.g., slow network connection.

The channel identification module 204, in certain embodiments, is configured to identify the second user associated with the audio channel that is echoing the audio of the first user. Each user, attendee, or participant in the conference call, or more particularly, each device that is connected to the conference call may be assigned a unique identifier such as a name, a user name, a random number or character string, and/or the like. Accordingly, when audio is received on an attendee's audio channel, the audio may be associated with the unique identifier for the device of the attendee, which can be used to identify the attendee, the attendee's audio channel, and/or the like.

In certain embodiments, if the attendee's identifier cannot be determine or the attendee doesn't have an associated identifier, the channel identification module 204 identifies the second user associated with the audio channel that is echoing the audio of the first user by cross-referencing historical trend information associated with each of the plurality of users in the conference call with one or more characteristics of each of the plurality of users. The one or more characteristics include one or more of a conferencing hardware configuration of each user and a position of each user relative to their conferencing hardware.

For instance, the channel identification module 204 may track historical conferencing information for each attendee in a conference call such as, for example, the conferencing hardware that an attendee uses. The conferencing hardware may include a microphone, a speaker, a computing device, a headset, and/or the like. The channel identification module 204 may audit or query the attendee's device to gather the hardware information, e.g., make, model, and/or other specifications of the hardware, when the attendee joins the conference call.

This information may be useful if certain hardware or hardware combinations have had a history of causing echoes during conference calls. Thus, the channel identification module 204 may check the hardware configurations for each attendee in the conference call to determine if any of the attendees have conferencing hardware configurations that match conferencing hardware configurations that are known to cause echoes, and if so, determines which audio channel is associated with the conferencing hardware configuration that may be causing the issue. For example, attendee 2 is noted to cause audio echo whenever a combination of speaker A and microphone B is used on his computer. Therefore, the channel identification module 204 can place a higher emphasis, or lower tolerance on detecting if this attendee is causing audio echo.

In certain embodiments, the channel identification module 204 identifies the second user associated with the audio channel that is echoing the audio of the first user by periodically playing a sound on an audio channel for each of the plurality of users and detecting the sound played back on the audio channel of the second user. For example, the channel identification module 204 may play a sound and then listen for that sound to be repeated via any attendee's audio channel. Such a sound may be heard and repeated through computer microphones and speakers. In this case, the channel identification module 204 can utilize any sound such as a new chat notification, a new attendee has arrived/left notification, or any audio notification in the conference. Listening for this sound to be repeated back on an attendee's audio channel allows for identification of problematic attendees.

In certain embodiments, the sound that the channel identification module 204 plays on the audio channel for each of the plurality of users in the conference call is played at a frequency that is outside a range of human hearing, e.g., less than 20 Hz or greater than 20 KHz, which prevents the sound from distracting attendees in the conference call.

In one embodiment, the correction module 206 is configured to perform a corrective action associated with the second user to prevent audio that is received from the first user from being echoed through the audio channel of the second user in response to identifying the audio channel that is producing the echo, and consequently the attendee associated with the audio channel.

In one embodiment, the correction module 206 performs a corrective action by automatically muting the audio channel of the second user. The correction module 206, for instance, may cut off the attendee's microphone, may ignore audio input received on the attendee's audio channel (e.g., without sending it to other attendees for playback), and/or the like.

In certain embodiments, the correction module 206 performs a corrective action by, in response to the second user attempting to unmute, warning the second user about previous issues with echoed audio and providing suggestions for preventing echoing audio. For example, the correction module 206 may present a visual or audible indicator to warn the user that his conferencing hardware configuration, e.g., microphone and speaker combination, has previously caused issues with echoing audio.

In one embodiment, a visual indication may include a message pop up, e.g., a push notification; a flashing box around the user's information on a display; and/or the like. In further embodiments, an audible indicator may include a tone, sound, beep, alarm, voice warning (e.g., a machine generated voice message), and/or the like.

In some embodiments, the correction module 206 may determine and provide one or more suggestions or recommendations for the user to prevent audio echo. For instance, the correction module 206 may suggest that the user move their microphone further from the speaker. In such an embodiment, the correction module 206 may determine a distance for moving the speaker and the microphone based on a video or image of the user's hardware layout, based on the audio that is echoed back through the microphone from the speaker (which can be used to determine the distance between the microphone and the speaker), and/or the like. The distance may include a total distance that the microphone and the speaker should be separated (e.g., 12 total inches), or an incremental distance for moving the microphone from the speaker (e.g., move the microphone two inches to the left), or the like.

The correction module 206 may provide suggestions for changing certain hardware settings (e.g., microphone sensitivity, speaker volume, or the like); changing hardware types (e.g., changing the speaker/microphone type or model); switching to a headset; and/or the like. The correction module 206 may further provide layout suggestions for the user's conferencing hardware, positioning suggestions for the user (e.g., distance to sit from the microphone/speaker (e.g., if the user is wearing a microphone), and/or the like.

In some embodiments, the correction module 206 performs a corrective action by notifying one or more other users of the plurality of users that the second user is the user echoing audio in the conference call. In such an embodiment, the correction module 206 may let other attendees know which attendee is creating the echo so that the other attendees, e.g., a conference moderator) may take a manual corrective action such as message the user, mute the user, assist the user to correct for the echoing audio, and/or the like.

In one embodiment, the correction module 206 performs a corrective action by preventing (e.g., ignoring, not forwarding, or the like) the repeated/echoed audio from being retransmitted to other user's in the conference after determining that the audio is an echoed audio and not a new audio stream from an attendee in the conference.

Figure 3:
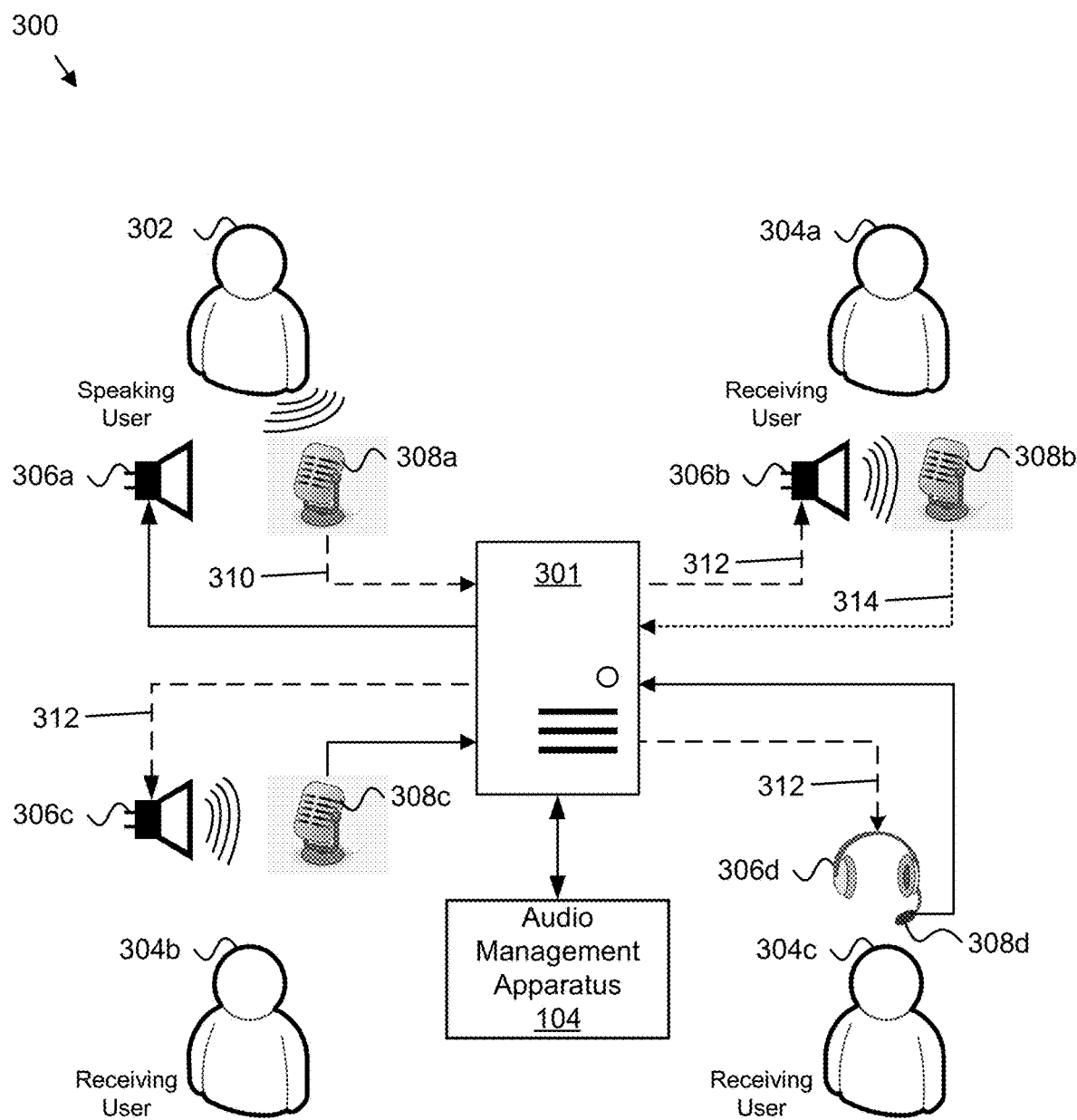
FIG. 3 is a schematic block diagram illustrating one example embodiment of detecting and correcting audio echo.

FIG. 3 depicts one example embodiment of a system 300 for detecting and correcting audio echo. In one embodiment, the system 300 includes a plurality of conference attendees—one that is currently speaking 302 and other receiving users 304a-c (collectively 304). Each attendee 302, 304 has a conferencing hardware configuration comprising a speaker 306a-d (collectively 306) and a microphone 308a-d (collectively 308).

The speaking attendee's 302 audio may be received at the microphone 308a and transmitted 310 to a central device 301, which may comprise an instance of an audio management apparatus 104, over an audio channel. The speaking attendee's audio may be transmitted 312 to the other user's 304 in the conference, where it is played back through the speakers 306b-d.

In the example embodiment, the first receiving user 304a may have a setup where the microphone 308b is too close to the speaker 306b such that the audio played back from the speaker 306b is picked up by the microphone 308b and transmitted 314 back to the device 301 where it is then retransmitted to the other users 302, 304c-d.

Accordingly, the audio management module 104, as described above, detects and corrects such as scenario by detecting the echoing audio, determining which audio channel/user the echoing audio is coming from, and performing one or more corrective actions to prevent the echoing audio during the conference call.

Figure 4:
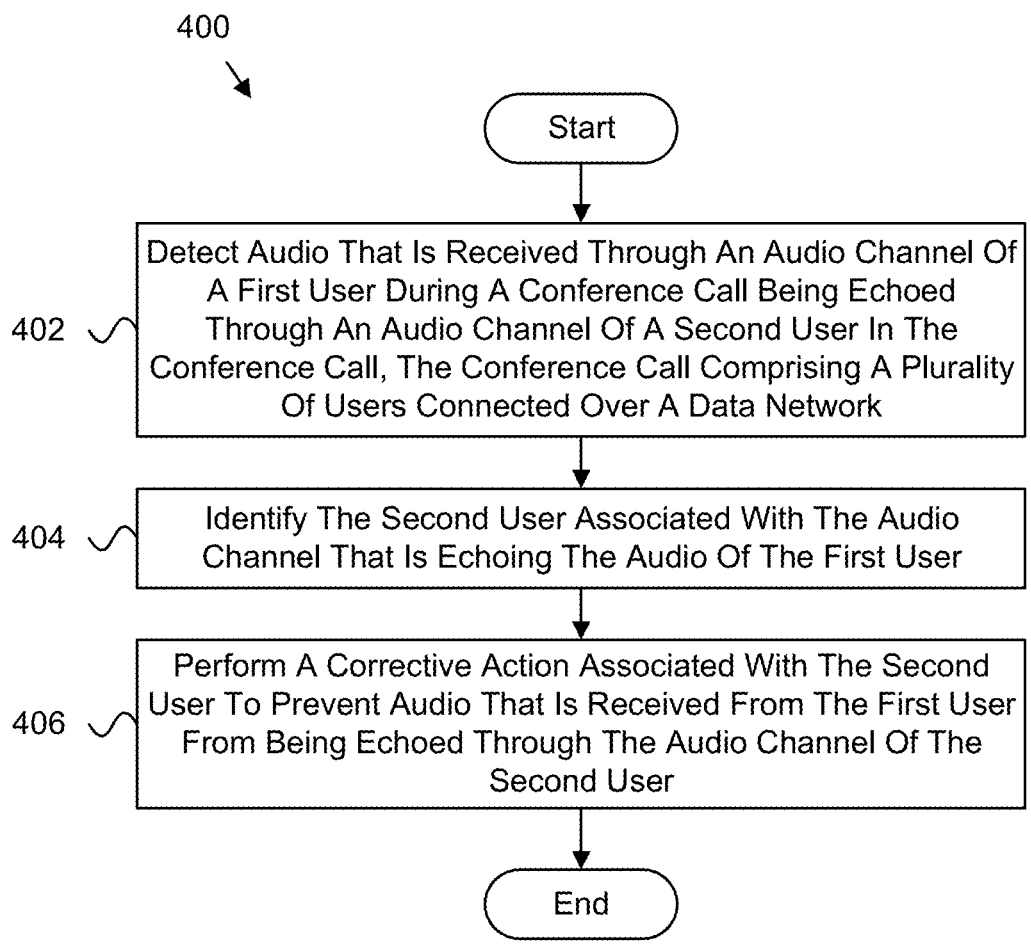
FIG. 4 is a schematic flow chart diagram illustrating one embodiment of a method for detecting and correcting audio echo.

FIG. 4 is a schematic flow chart diagram illustrating one embodiment of a method 400 for detecting and correcting audio echo. In one embodiment, the method 400 begins and detects 402 audio that is received through an audio channel of a first user during a conference call being echoed through an audio channel of a second user in the conference call.

In certain embodiments, the method 400 identifies 404 the second user associated with the audio channel that is echoing the audio of the first user. In further embodiments, the method 400 performs 406 a corrective action associated with the second user to prevent audio that is received from the first user from being echoed through the audio channel of the second user, and the method 400 ends. In one embodiment, the echo detection module 202, the channel identification module 204, and the correction module 206 perform the various steps of the method 400.

Figure 5A:
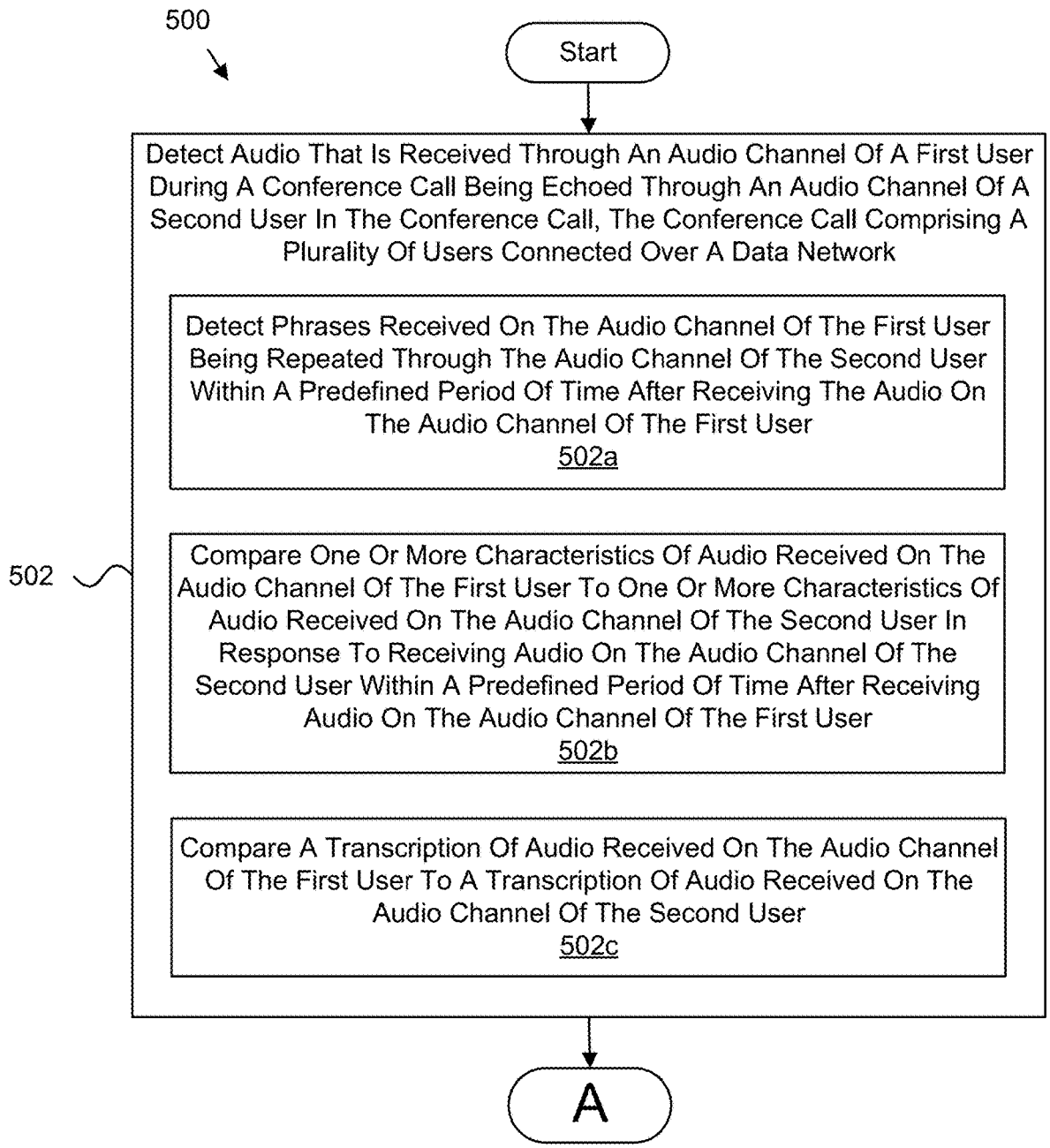
FIG. 5A is a schematic flow chart diagram illustrating one embodiment of another method for detecting and correcting audio echo.

FIG. 5A is a schematic flow chart diagram illustrating one embodiment of another method 500 for detecting and correcting audio echo. In one embodiment, the method 500 begins and detects 502 audio that is received through an audio channel of a first user during a conference call being echoed through an audio channel of a second user in the conference call.

In one embodiment, the method 500 detects 502a phrases received on the audio channel of the first user being repeated through the audio channel of the second user within a predefined period of time after receiving the audio on the audio channel of the first user.

In some embodiments, the method 500 compares 502b one or more characteristics of audio received on the audio channel of the first user to one or more characteristics of audio received on the audio channel of the second user in response to receiving audio on the audio channel of the second user within a predefined period of time after receiving audio on the audio channel of the first user.

In further embodiments, the method 500 compares 502c a transcription of audio received on the audio channel of the first user to a transcription of audio received on the audio channel of the second user.

In one embodiment, following 'A' to FIG. 5B, the method 500 identifies 504 the second user associated with the audio channel that is echoing the audio of the first user. In certain embodiments, the method 500 cross-references 504a historical trend information associated with each of the plurality of users in the conference call with one or more characteristics of each of the plurality of users. In some embodiments, the method 500 periodically plays 504b a sound on an audio channel for each of the plurality of users and detects the sound played back on the audio channel of the second user.

In further embodiments, the method 500 performs 506 a corrective action associated with the second user to prevent audio that is received from the first user from being echoed through the audio channel of the second user. In one embodiment, the method 500 automatically mutes 506a the audio channel of the second user.

In further embodiments, the method 500, in response to the second user attempting to unmute, warns 506b the second user about previous issues with echoed audio and provides suggestions for preventing echoing audio. In some embodiments, the method 500 notifies 506c one or more other users of the plurality of users that the second user is the user echoing audio in the conference call. In various embodiments, the method 500 provides 506d one or more suggestions to the second user to change their conferencing hardware configuration and/or their position relative to their conferencing hardware, and the method 500 ends. In one embodiment, the echo detection module 202, the channel identification module 204, and the correction module 206 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a memory that stores code executable by the processor to:
   detect audio that is received through an audio channel of a first user during a conference call being echoed through an audio channel of a second user in the conference call, the conference call comprising a plurality of users connected over a data network, wherein detecting the echoed audio comprises detecting phrases received on the audio channel of the first user being repeated through the audio channel of the second user within a predefined period of time after receiving the audio on the audio channel of the first user;

identify the second user associated with the audio channel that is echoing the audio of the first user; and perform a corrective action associated with the second user to prevent audio that is received from the first user from being echoed through the audio channel of the second user.

2. The apparatus of claim 1, wherein the code is executable by the processor to determine that audio received on the audio channel of the first user is being echoed through the audio channel of the second user in response to a number of detected repeated phrases satisfying a threshold number.

3. The apparatus of claim 1, wherein the code is executable by the processor to compare a transcription of audio received on the audio channel of the first user to a transcription of audio received on the audio channel of the second user to detect that the phrases spoken by the first user are being repeated through the audio channel of the second user.

4. The apparatus of claim 1, wherein detecting the echoed audio comprises comparing one or more characteristics of audio received on the audio channel of the first user to one or more characteristics of audio received on the audio channel of the second user in response to receiving audio on the audio channel of the second user within a predefined period of time after receiving audio on the audio channel of the first user.

5. The apparatus of claim 4, wherein the compared one or more characteristics of the audio received on the audio channels of the first user and the second user comprises one or more of an audio length and an audio signature.

6. The apparatus of claim 1, wherein identifying the second user associated with the audio channel that is echoing the audio of the first user comprises cross-referencing historical trend information associated with each of the plurality of users in the conference call with one or more characteristics of each of the plurality of users.

7. The apparatus of claim 6, wherein the one or more characteristics comprises one or more of a conferencing hardware configuration and a position of each user relative to their conferencing hardware configuration.

8. The apparatus of claim 1, wherein identifying the second user associated with the audio channel that is echoing the audio of the first user comprises:

periodically playing a sound on an audio channel for each of the plurality of users, the sound played at a frequency that is outside a range of human hearing; and detecting the sound played back on the audio channel of the second user.

9. The apparatus of claim 1, wherein performing the corrective action comprises automatically muting the audio channel of the second user.

10. The apparatus of claim 1, wherein performing the corrective action comprises, in response to the second user attempting to unmute, warning the second user about previous issues with echoed audio and providing suggestions for preventing echoing audio.

11. The apparatus of claim 1, wherein performing the corrective action comprises notifying one or more other users of the plurality of users that the second user is the user echoing audio in the conference call.

12. The apparatus of claim 1, wherein performing the corrective action comprises providing one or more suggestions to the second user to change their conferencing hardware configuration and/or their position relative to their conferencing hardware.

13. A method, comprising:

detecting, by a processor, audio that is received through an audio channel of a first user during a conference call being echoed through an audio channel of a second user in the conference call, the conference call comprising a plurality of users connected over a data network, wherein detecting the echoed audio comprises detecting phrases received on the audio channel of the first user being repeated through the audio channel of the second user within a predefined period of time after receiving the audio on the audio channel of the first user;

identifying the second user associated with the audio channel that is echoing the audio of the first user; and performing a corrective action associated with the second user to prevent audio that is received from the first user from being echoed through the audio channel of the second user.

14. The method of claim 13, wherein detecting the echoed audio comprises comparing a transcription of audio received on the audio channel of the first user to a transcription of audio received on the audio channel of the second user to detect that the phrases spoken by the first user are being repeated through the audio channel of the second user.

15. The method of claim 13, wherein detecting the echoed audio comprises comparing one or more characteristics of audio received on the audio channel of the first user to one or more characteristics of audio received on the audio channel of the second user in response to receiving audio on the audio channel of the second user within a predefined period of time after receiving audio on the audio channel of the first user.

16. The method of claim 13, wherein identifying the second user associated with the audio channel that is echoing the audio of the first user comprises cross-referencing historical trend information associated with each of the plurality of users in the conference call with one or more characteristics of each of the plurality of users.

17. The method of claim 13, wherein identifying the second user associated with the audio channel that is echoing the audio of the first user comprises:

periodically playing a sound on an audio channel for each of the plurality of users, the sound played at a frequency that is outside a range of human hearing; and detecting the sound played back on the audio channel of the second user.

18. A computer program product, comprising a non-transitory computer readable storage medium having program instructions embodied therewith, the program instructions executable by a processor to cause the processor to:

detect audio that is received through an audio channel of a first user during a conference call being echoed through an audio channel of a second user in the conference call, the conference call comprising a plurality of users connected over a data network, wherein detecting the echoed audio comprises detecting phrases received on the audio channel of the first user being repeated through the audio channel of the second user within a predefined period of time after receiving the audio on the audio channel of the first user;

identify the second user associated with the audio channel that is echoing the audio of the first user; and perform a corrective action associated with the second user to prevent audio that is received from the first user from being echoed through the audio channel of the second user.

* * * * *